(12) United States Patent  (10) Patent No.: US 6,601,336 B1
Link  (45) Date of Patent: Aug. 5, 2003

(54) FILAMENTARY SPINNER BLADE AND RATTLE DRESSINGS

(75) Inventor: Donald J. Link, Shakopee, MN (US)

(73) Assignee: Skirts Plus, Inc., Savage, MN (US)

( * ) Notice: Subject to any disclaimer, the term of this patent is extended or adjusted under 35 U.S.C. 154(b) by 0 days.

(21) Appl. No.: 09/618,490

(22) Filed: Jul. 18, 2000

(51) Int. Cl.[7] ............................................. A01K 85/10
(52) U.S. Cl. ...................... 43/42.13; 43/42.11; 43/42.14
(58) Field of Search ........................... 43/42.11, 42.13, 43/42.14, 42.19, 42.31

(56) References Cited

U.S. PATENT DOCUMENTS

| 481,652 | A | * | 8/1892 | Loftie | 43/42.19 |
|---|---|---|---|---|---|
| 2,857,703 | A | * | 10/1958 | Parmlee | 43/42.28 |
| 2,935,809 | A | * | 5/1960 | Pratt | 43/42.13 |
| 3,824,732 | A | * | 7/1974 | Boone | 43/42.19 |
| 3,828,463 | A | * | 8/1974 | Perrin | 43/42.11 |
| 4,617,753 | A | * | 10/1986 | Pauley et al. | 43/42.19 |
| 4,742,639 | A | * | 5/1988 | Gunn | 43/42.13 |
| 5,022,177 | A | * | 6/1991 | Gibson | 43/42.13 |
| 5,024,019 | A | * | 6/1991 | Rust et al. | 43/42.11 |
| 5,136,801 | A | * | 8/1992 | Pond | 43/42.13 |
| 5,426,886 | A | * | 6/1995 | Stanley | 43/42.31 |
| 5,517,782 | A | * | 5/1996 | Link et al. | 43/42.31 |
| 5,524,378 | A | * | 6/1996 | Hood | 43/42.31 |
| 5,524,379 | A | * | 6/1996 | Hood | 43/42.31 |
| 5,709,047 | A | * | 1/1998 | Link | 43/42.31 |
| 5,899,015 | A | * | 5/1999 | Link | 43/42.39 |
| 5,930,941 | A | * | 8/1999 | Hayes II et al. | 43/42.13 |
| 5,956,886 | A | * | 9/1999 | Choate | 43/42.13 |
| 6,018,901 | A | * | 2/2000 | DuBois | 43/42.19 |
| 6,173,521 | B1 | * | 1/2001 | Rockhill, Jr. | 43/42.13 |
| 6,199,312 | B1 | * | 3/2001 | Link | 43/42.24 |

FOREIGN PATENT DOCUMENTS

| FR | 852612 B1 | * | 10/1939 | 43/42.19 |
|---|---|---|---|---|
| FR | 1026363 B1 | * | 4/1953 | 43/42.14 |

* cited by examiner

Primary Examiner—Darren W. Ark
(74) Attorney, Agent, or Firm—Altera Law Group LLC

(57) ABSTRACT

Detachable lure dressings having modular spinner blade assemblies and rattle chambers that mount to elastomer collars and filaments at a fishing lure. The dressings enhance the audible and visual flash characteristics of a lure. Improved spinner baits are also disclosed wherein elastomer spinner blade and/or rattle assemblies are mounted to projecting wire or plastic arms. A flexible elastomer arm having spinner blades and/or rattles mounted to swivels is particularly supported at a collar to a rigid wire form that projects from the lure.

4 Claims, 15 Drawing Sheets

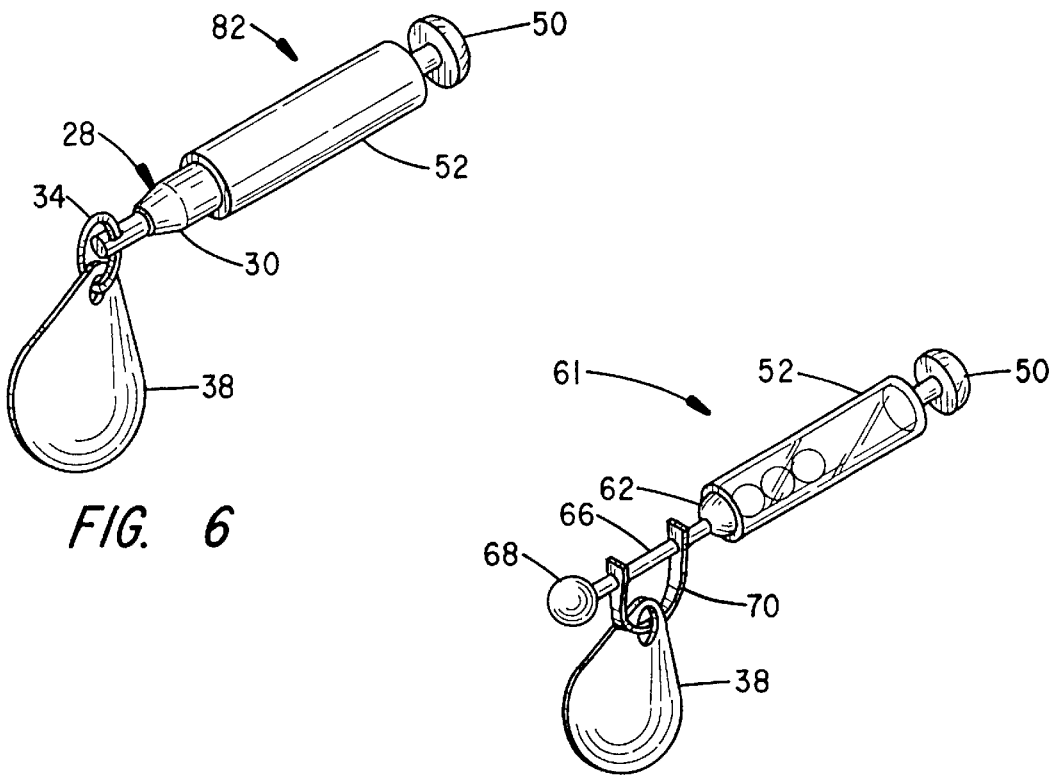
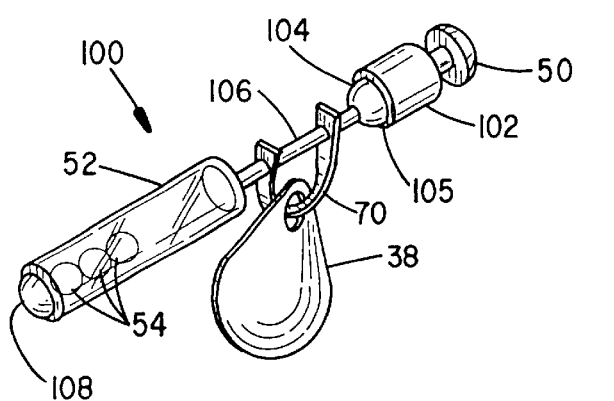

FILAMENTARY SPINNER BLADE AND RATTLE DRESSINGS

BACKGROUND OF THE INVENTION

The present invention relates to lure dressings and, in particular, to a modular system of spinner blade assemblies, rattle assemblies or combination rattle-spinner blade assemblies that can be mounted to elastomer collars and filamentary arms or to a wire form or filament weed guard that extends from a lure.

A variety of rattle dressings have been developed for fishing lures to enhance lure presentation with audible sound. U.S. Pat. Nos. 5,899,015; 5,709,047; 5,524,378; 5,524,379; 5,517,782; and 5,426,886 disclose a number of rattle lures and modular rattle dressings. Some of the foregoing include rattles that are molded into the lead head of the lure. Others disclose detachable collars that can support rattle assemblies.

Spinner blade dressings also exist that enhance lure presentation with visual flash and movement. The spinner blades are typically attached to wire forms (i.e. bent wire supports) or other rigid supports that allow the blades to freely move.

The modular dressings of the present invention were developed to appeal to the visual and audible senses of a fish. Some enhance both audible and visual presentation of a lure. A variety of modular assemblies are particularly disclosed that can be attached to a desired lure (e.g. a jig or spinner bait) at flexible elastomer supports such as collars or filaments that extend from such collars. The spinner blade and rattle assemblies are also mountable to filaments and wire forms that extend from a lure. The durometer of filamentary portions of each assembly can be tailored to provide a preferred flexibility to match the lure and/or other provided dressings, such as multi-filament skirts and trailer dressings (e.g. molded artificial bait).

SUMMARY OF THE INVENTION

It is a primary object of the invention to provide a modular system of dressings for fishing lures wherein detachable visual and audible stimulating assemblies mount to elastomer collars and/or filamentary arms that extend from a collar piece or members that project from a lure.

It is a further object of the invention to provide alternative spinner blade assemblies that mount to elastomer collars and/or filamentary arms that extend from a collar piece.

It is a further object of the invention to provide alternative spinner blade assemblies that extend from rattle chambers that mount to elastomer collars and/or filamentary arms that extend from a collar piece.

It is a further object of the invention to provide alternative combinations of rattle chambers that are sealed with spinner blade assemblies and which chambers mount to other rattle chambers along a filamentary support.

It is a further object of the invention to provide spinner blade and/or rattle assemblies that mount to a filamentary member that extends from a fishing lure.

It is a further object of the invention to provide spinner blade and rattle assemblies having a collar and a filamentary elastomer member that mount to a wire form support that extends from a fishing lure.

The foregoing objects, advantages and distinctions of the invention, among others, are obtained in a number of presently preferred assemblies. Several assemblies provide filaments that extend from a bored elastomer collar and which filaments include recessed end caps or couplers having a cavity that support a swivel mounted spinner blade. Several assemblies provide bored collars or collars with filaments having couplers and/or recessed end caps that support rattle chambers that are plugged with swivel-mounted spinner blades.

Other assemblies include multiple rattle chambers that are interconnected with a filament and one of which rattle chambers supports a swivel mounted spinner blade. Another assembly includes a spinner blade mounted between a rattle chamber and a connector flange. Another assembly includes a spinner blade assembly that connects to a filament that extends from a fishing lure.

Still other assemblies provide fishing lures having wire forms that extend from a headpiece. A collar mounts to the wire form and elastomer filament(s) that support swivel mounted spinner blades and/or rattles trail from the collar.

Still other objects, advantages and distinctions of the invention will become more apparent upon reference to the following detailed description with respect to the appended drawings. Similar components and assemblies shown at the various drawings are referred to with similar alphanumeric reference characters. To the extent various modifications and improvements have been considered, they are described as appropriate.

BRIEF DESCRIPTION OF THE DRAWINGS

FIG. 6 is a perspective drawing showing a detachable rattle chamber and swivel mounted spinner blade end cap that can be mounted to a filamentary strap or collar.

FIG. 7 is a perspective drawing showing a detachable rattle chamber and clevis mounted spinner blade end cap that can be mounted to a filamentary strap or collar.

FIG. 8 is a perspective drawing showing a detachable flanged end cap that supports a clevis mounted spinner blade and rattle chamber that can be mounted to a filamentary strap or collar.

DESCRIPTION OF THE PREFERRED EMBODIMENTS

Figure 1:
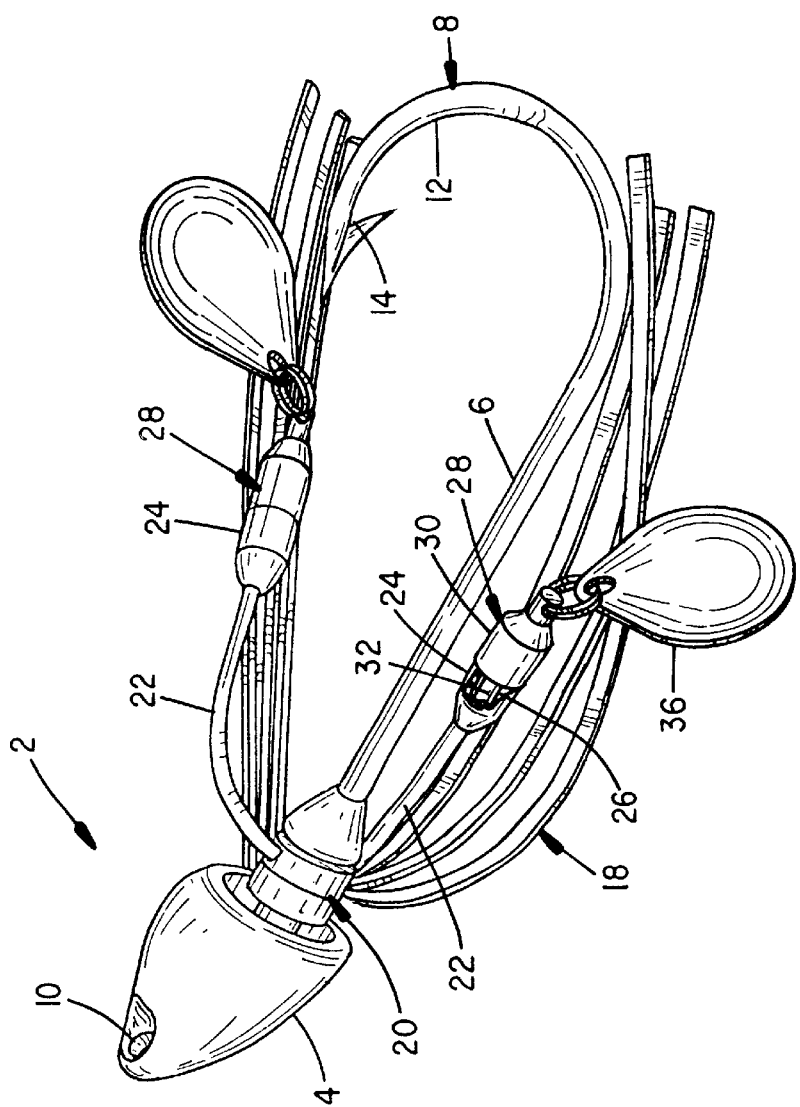
FIG. 1 is a perspective drawing showing a fishing jig outfitted with a filamentary strap having swivel mounted spinner blade end pieces.

Referring to FIG. 1 a jig-type fishing lure 2 is shown that includes a weighted head 4 and from which the shank 6 of a hook 8 extends. A fish line attaches to an eye 10 at the head 4. The shank 6 terminates in a bend 12 and barb 14. A flanged appendage 16 projects from the head 4 along the shank 6 and supports a multi-stranded skirt 18.

Figure 2:
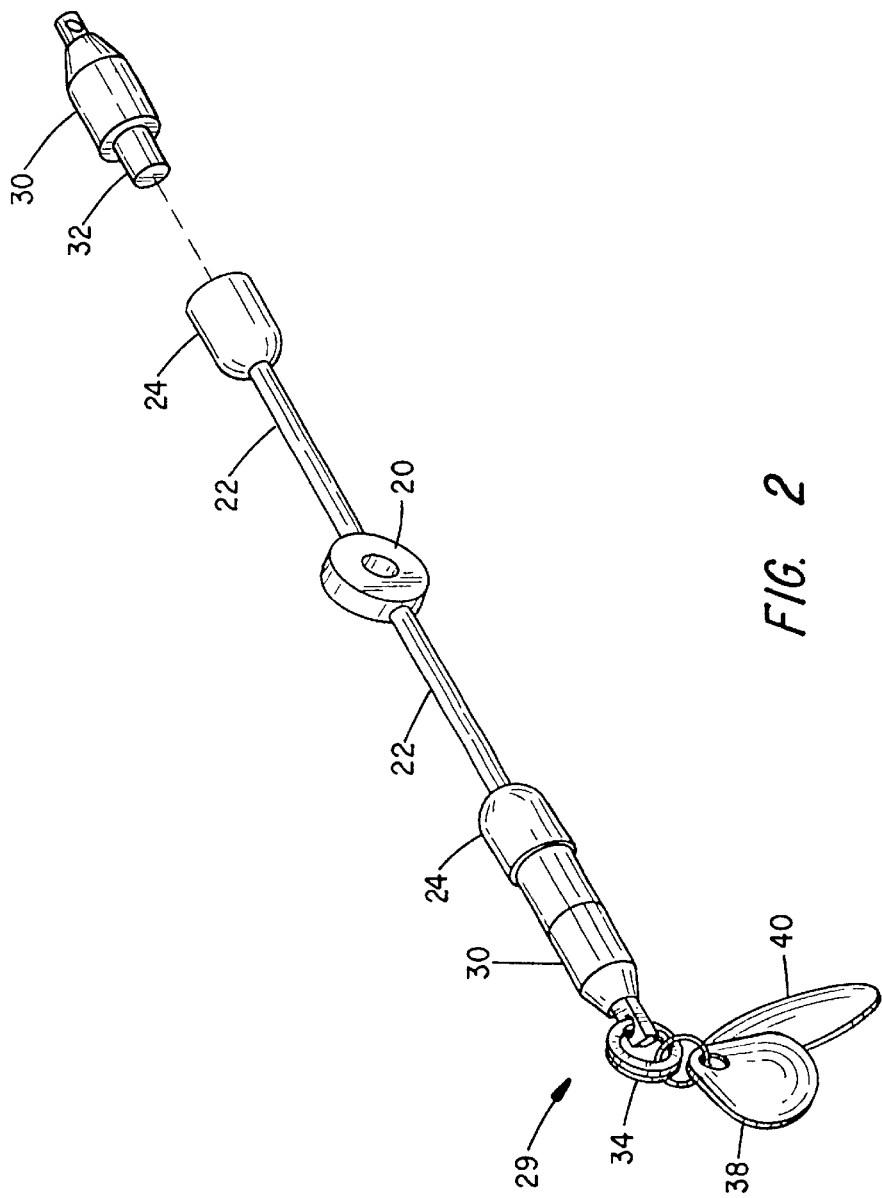
FIG. 2 is a perspective drawing showing the filamentary strap of FIG. 1 with one of the detachable swivel spinner blade end pieces shown in exploded assembly.

An elastomer collar 20 and integral filaments 22 are also attached to the appendage 16, see also FIG. 2. Couplers or end caps 24 at the filaments 22 provide recessed cavities 26 that support a spinner blade assembly 28. Each spinner blade assembly 28 includes a suitable swivel 30 having a headpiece 32, a split ring 34 and one or more spinner blades 36 of appropriate size and shape. The headpiece 32 is shaped to interconnect and mate with any fitting or recess at the end cap 24. The spinner blade 36 can comprise any available conventional blade or a specially formed blade.

FIGS. 2–5 disclose other elastomer collars with filaments that support other spinner blade and rattle assemblies and that can be mounted to a lure 2. FIG. 2 shows a collar 20 having filamentary arms 22 and end caps 24 that support a spinner blade assembly 29, only one of which is shown, and wherein Colorado and willow leaf spinner blades 38 and 40 are mounted to the split ring 34. The swivel 30 of the other spinner blade assembly 29 is shown in exploded assembly to expose the headpiece 32.

Figure 3:
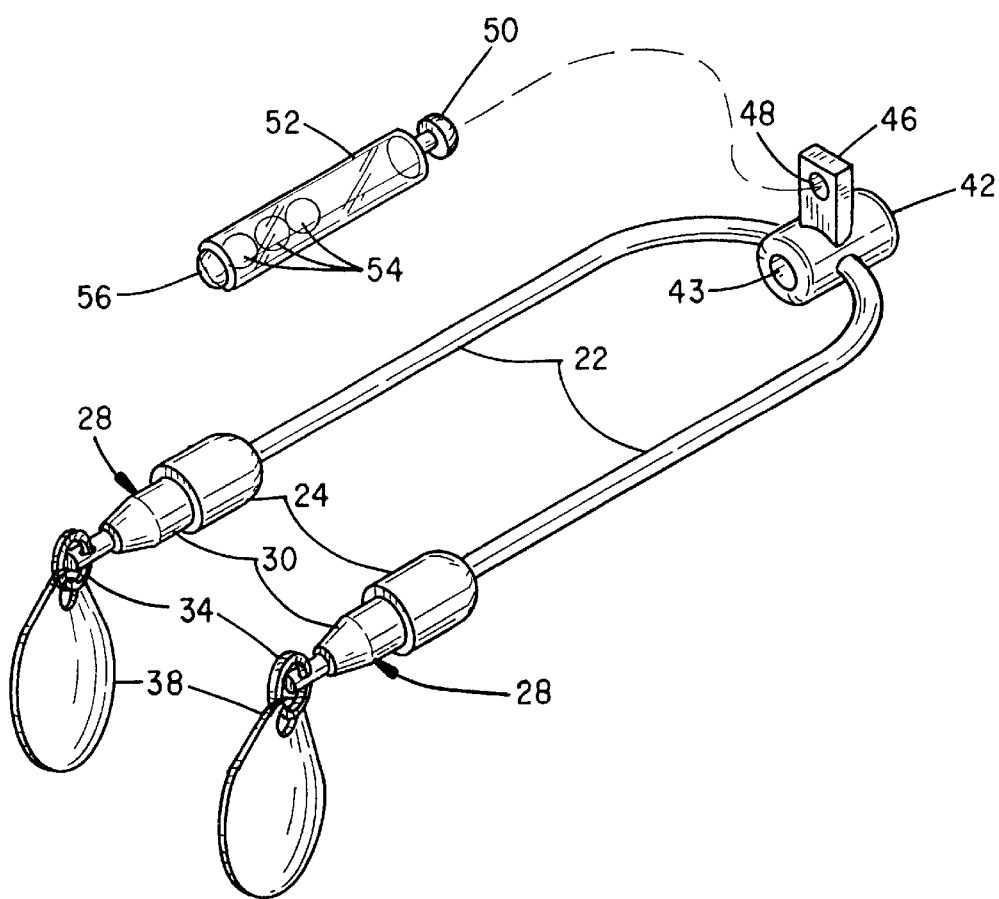
FIG. 3 is a perspective drawing showing a filamentary strap with detachable spinner blade end pieces and a center rattle.

FIG. 3 shows a cylindrical elastomer collar 42 having a bore 43 and a pair of integral filaments 22. Swivels 30 mount to end caps 24 and support single Colorado spinner blades 38. A tab or appendage 46 with a bore 48 extends from the collar 42 and receives a flanged head 50 of a rattle chamber 52. The chamber 52 is filled with a number of rattle members 54 and sealed with an end cap or stop 56. The chamber 52 can be transparent or opaque.

Figure 4:
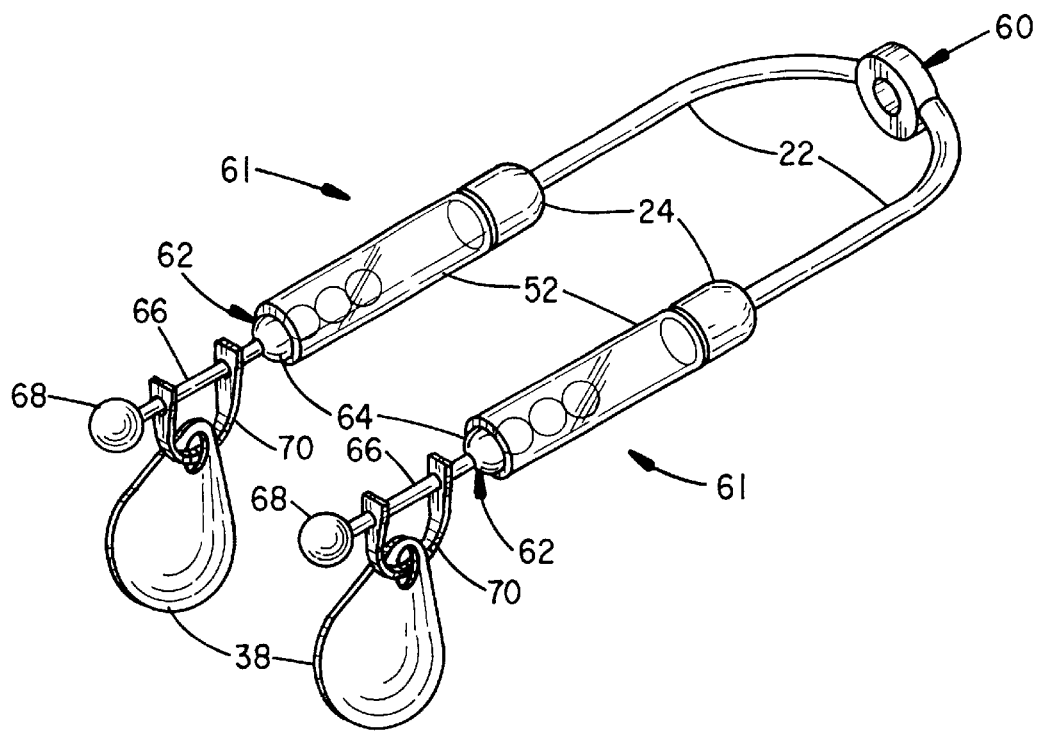
FIG. 4 is a perspective drawing showing a filamentary strap with detachable rattle chambers and clevis mounted spinner blade end caps.

FIG. 4 shows an elastomer collar 60 having filaments 22 and end caps 24 that support rattle assemblies 61 that provide a plastic rattle chamber 52 having a flanged headpiece. The assembly 61 is also shown in FIG. 7. Spinner blade end stops 62 are mounted to the chambers 52. Each end stop 62 includes a bead 64 or other suitable plug member that is secured to the chamber 52 and a filament 66 that extends to a stop piece 68. A stirrup clevis 70 and spinner blade 38 are fitted in conventional fashion to each filament 66. The filament 66 can be constructed of wire, monofilament, or rubber.

Figure 5:
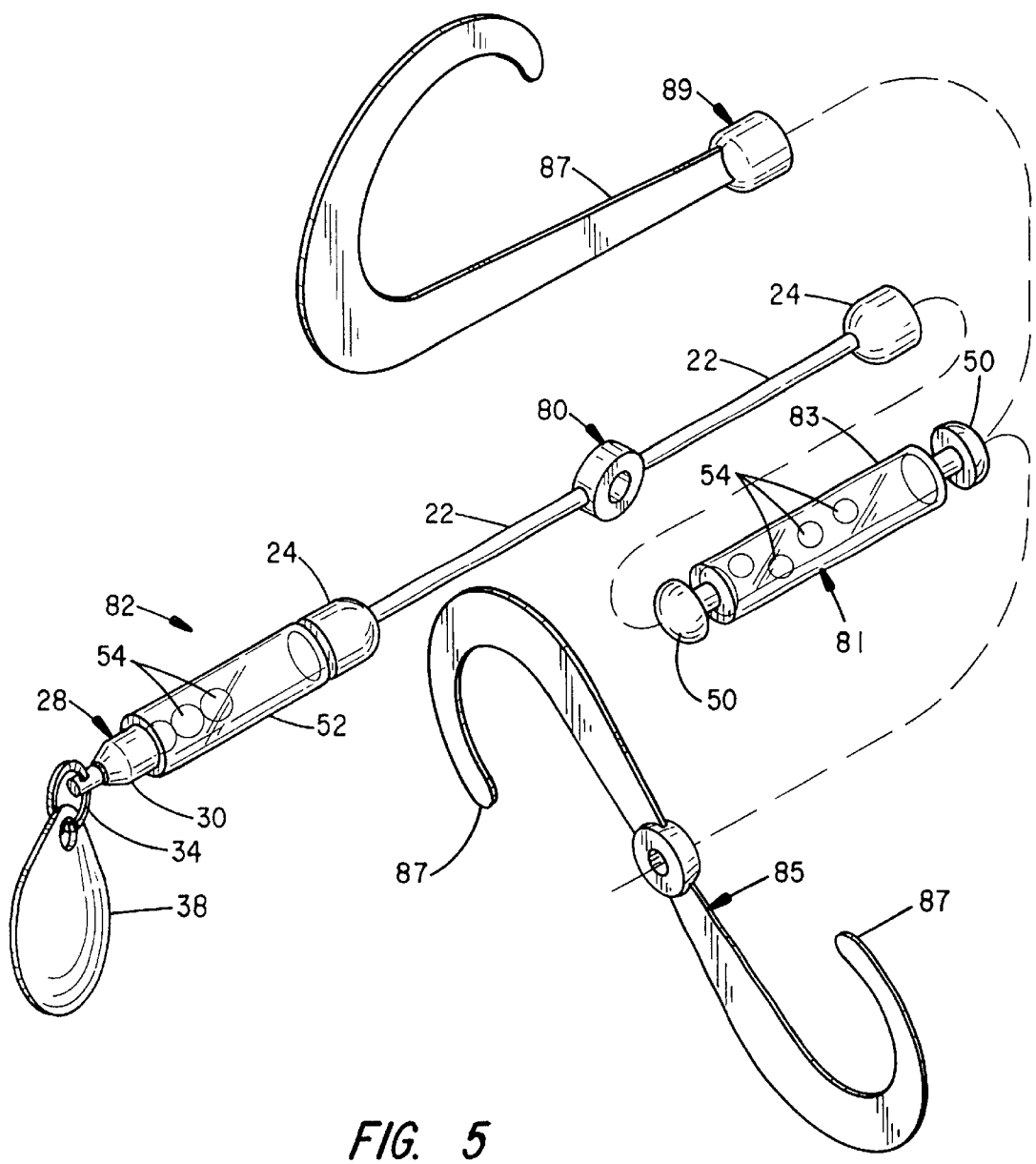
FIG. 5 is a perspective drawing showing a filamentary strap with a detachable rattle chamber and swivel mounted spinner blade end cap.

FIG. 5 shows another elastomer collar 80 having filaments 22 that terminate in end caps 24. One end cap is shown fitted with a spinner blade/rattle assembly 82 that includes a transparent rattle chamber 52 (only one of which is shown). The assembly 82 is also shown in FIG. 6 with an opaque rattle chamber 52. A spinner blade end stop 28 includes a swivel 30, split ring 34 and spinner blade 38. The barrel of the swivel 30 or a headpiece mounts to plug the end of the chamber 52.

Also shown in FIG. 5 is a rattle and tail assembly 81 that can be fitted to an end cap 24. A rattle chamber 83 is provided that is fitted with flanged heads 50 at both ends. One end 50 mounts to an end cap 24 and the other can support either an elastomer tailpiece 85 with two curlicue arms 87 or a tailpiece 89 with a single curlicue arm 87. A variety of other compatible dressings can also be secured to the exposed head 50.

FIG. 8 shows an alternative rattle assembly 100 that can be attached to any of the end caps 24. A flanged headpiece 50 extends from a coupler 102 and a bead 104 is mounted in a recess 105 of the coupler 102. A filament 106 extends from the bead 104 and a stirrup clevis 70 and spinner blade 38 are mounted thereto. A rattle chamber 52 containing beads 50 and end stop 108 extends from the filament 106. The filament 106 can be secured to the chamber in a variety of fashions, for example, either directly or with an intermediate coupler.

Although the assemblies of FIGS. 1 and 5 provide for a single collar and pair of filaments disposed 180 degrees apart, other arrangements of collars and filaments can be provided.

Figure 9:
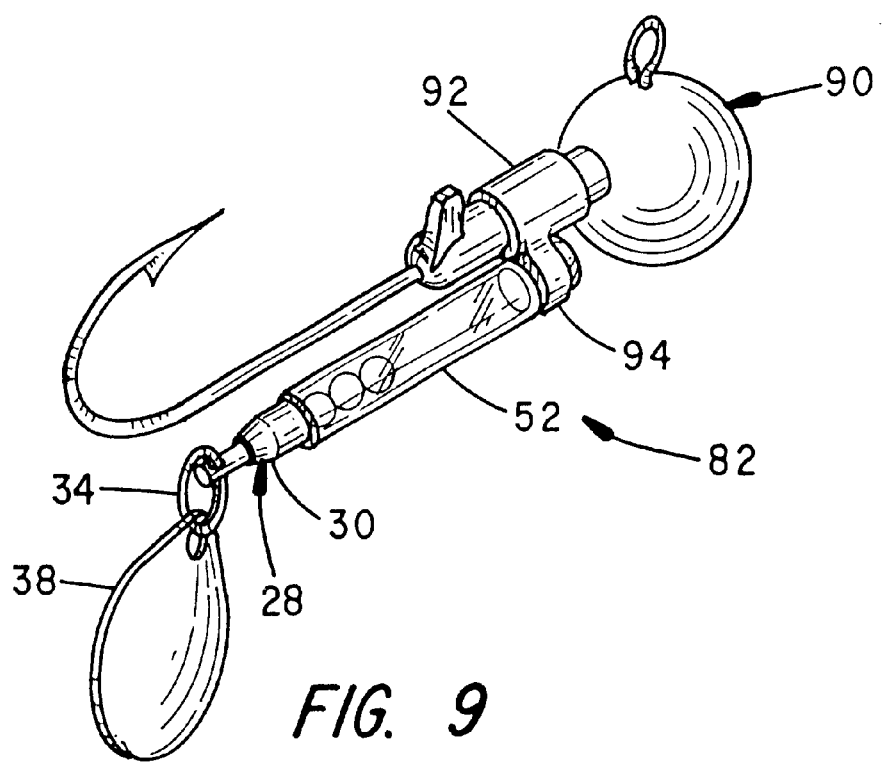
FIG. 9 is a perspective drawing showing a fishing jig fitted with an elastomer collar and the detachable rattle chamber and swivel mounted spinner blade end cap of FIG. 7.

FIG. 9 discloses a fishing jig 90 fitted with an elastomer collar 92 and a single appending bored arm 94. A detachable rattle assembly 82 and swivel mounted spinner blade 38 is mounted to the arm 94 and extends parallel to the hook. A multi-stranded skirt or other dressings can be attached to the jig 90 or hook.

Figure 10:
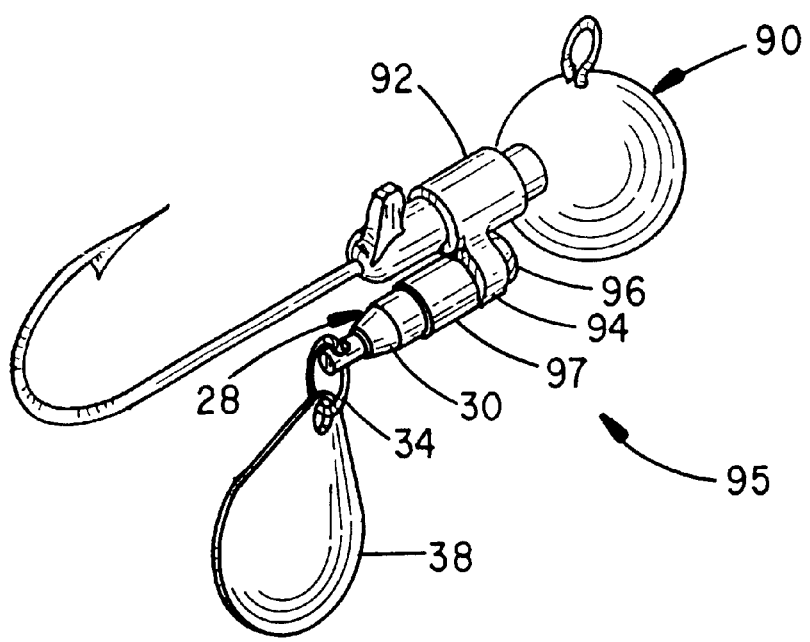
FIG. 10 is a perspective drawing showing a fishing jig fitted with an elastomer collar and a detachable swivel mounted spinner blade attached thereto.

FIG. 10 discloses another fishing jig 90 fitted with an elastomer collar 92 and a single appending bored arm 94. A detachable spinner blade assembly 95 is mounted to the arm 94. The assembly 95 provides a flanged headpiece 96 that extends from a coupler 97 having a recessed cavity. The headpiece (not shown) of a swivel 30 is secured in the coupler 97. A split ring 34 supports a spinner blade 38.

Figure 18:
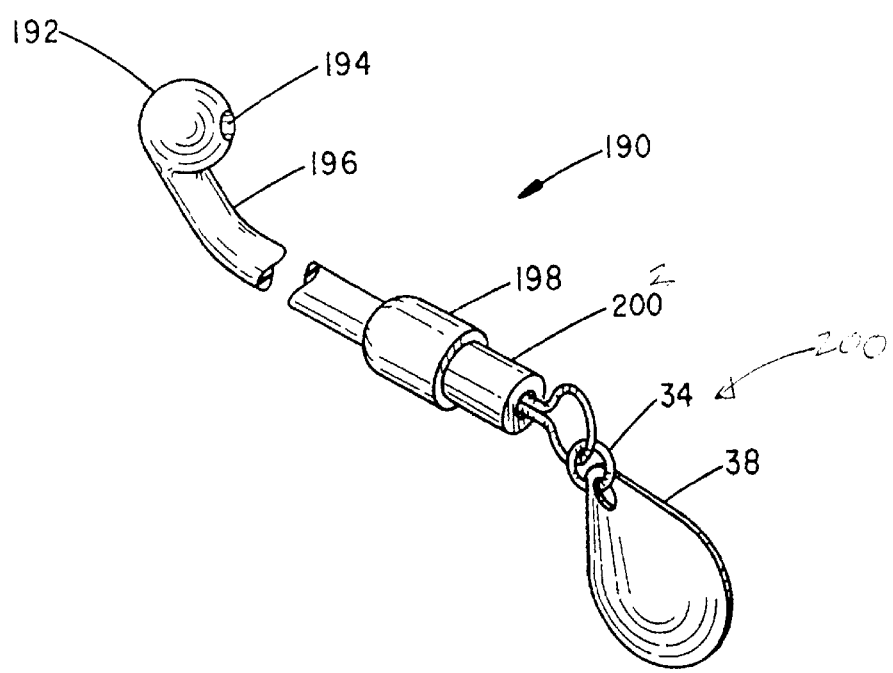
FIG. 18 is a perspective drawing showing an elastomer collar with an elongated arm and detachable swivel mounted spinner blade end cap that can be mounted to a jig in the fashion of FIG. 9.

FIG. 18 shows another rattle assembly 190 that can also be mounted to a jig 90. A spherical elastomer collar 192 has a bore 194 and an arm 196. An end cap 198 supports an adhesively bonded barrel swivel 202, split ring 34 and spinner blade 38. The length of the arm 196 can be molded as desired.

Figures 11, 12:
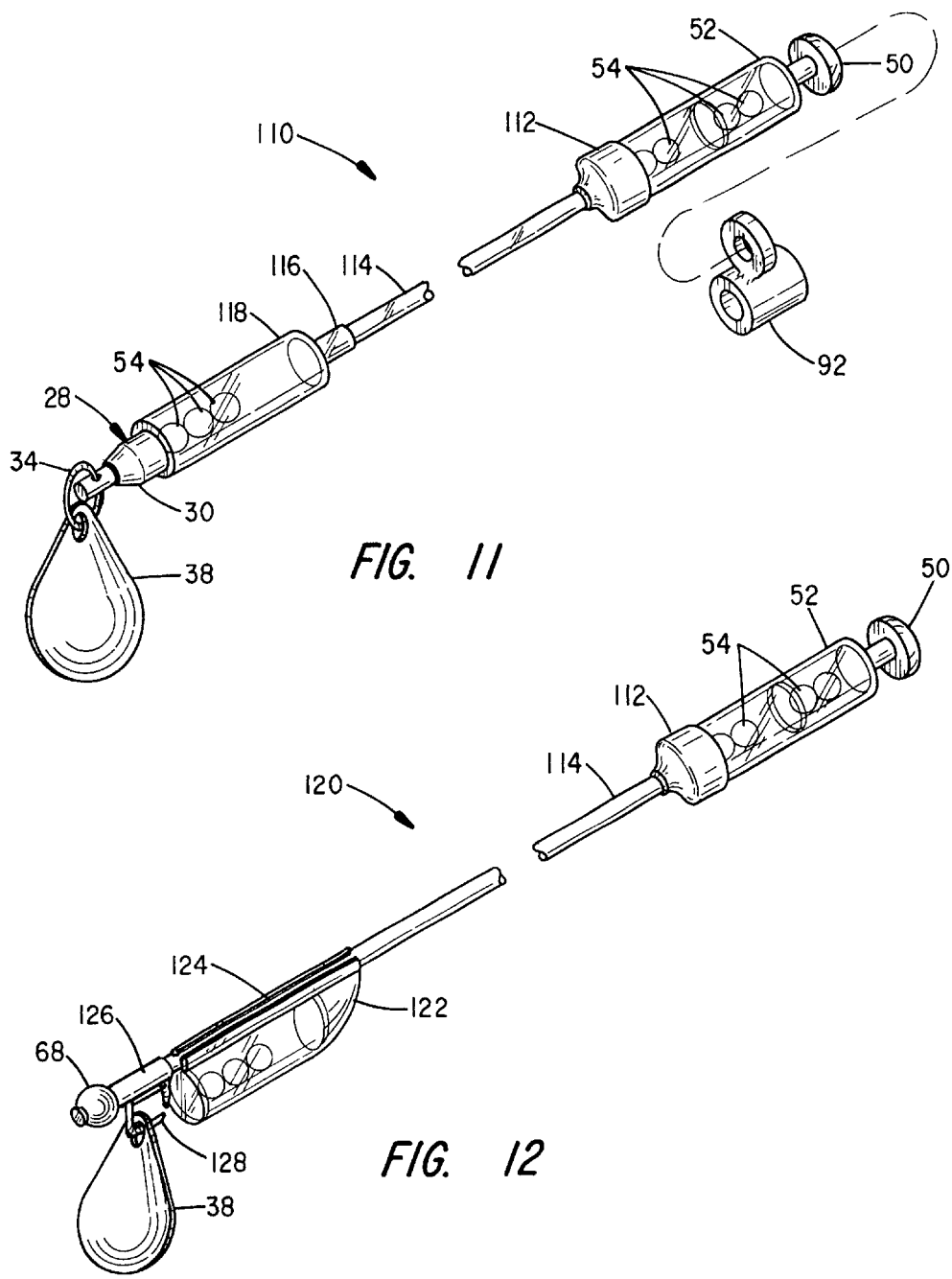
FIG. 11 is a perspective drawing showing a rattle chamber and detachable extension filament with a rattle chamber and swivel mounted spinner blade end cap that can be mounted to a jig such as in FIG. 6.
FIG. 12 is a perspective drawing showing a rattle chamber and detachable extension filament with a rattle chamber and QUICK CHANGE clevis mounted spinner blade end cap that can be mounted to a jig such as in FIG. 6.
Figure 13:
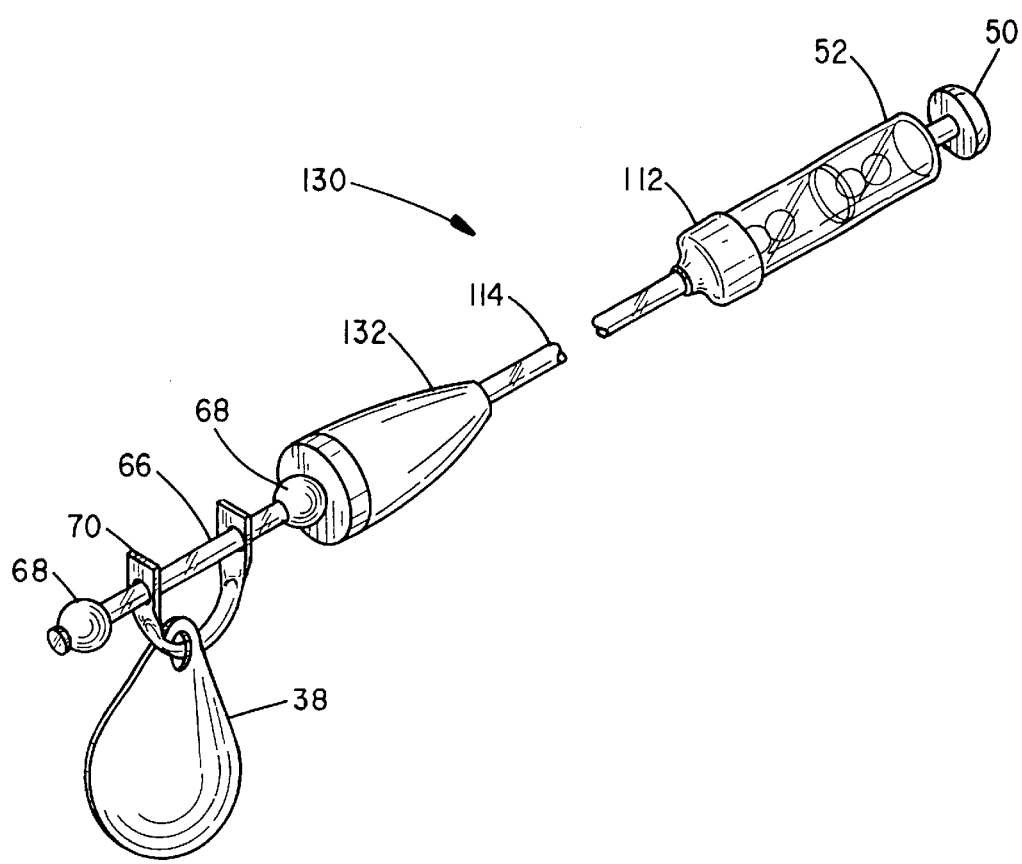
FIG. 13 is a perspective drawing showing a rattle chamber and detachable extension filament with a clevis mounted spinner blade end cap.

FIGS. 11, 12 and 13 show still other modular rattle and blade combination assemblies that can be fitted to a collar arm 94, end cap 24 or other coupler that attaches to a lure. The assembly 110 of FIG. 11 provides a rattle chamber 52 having a flanged headpiece 50. A coupler 112 mounts to the end of the chamber 52 and a filament 114 extends to a fitting 116 at another rattle chamber 118. A spinner blade end stop assembly 84 is mounted to the chamber 118.

The length and flexibility of the filament 114 can be varied as desired. The filament 114 can be constructed from a monofilament line, a single or multi stranded wire or a rubber strand. Depending upon the filament material, the coupler 112 and fitting 116 can be varied. For example, the filament 114 can be secured to a bead 62 at either of the chambers 52 or 118.

The assembly 120 of FIG. 12, although similar to the assembly 110, provides a rattle chamber 122 having a tubular sleeve or open-sided channel 124 along a longitudinal surface that accepts the filament 114. A commercially available QUICK CHANGE clevis 126 is mounted to the filament 114 and provides a flexible, open arm 128 that permits the changing of the spinner blade 38. A stop bead 68 is secured to the distal end 129 of the filament 114 and which is melted to secure the assembly 120 together. The rattle chamber 122 can be permanently bonded to the filament 114 or permitted to slide to and fro with the clevis 126 and blade 38.

Another assembly 130 of FIG. 13 provides a bullet-shaped rattle chamber 132 and through which the filament 114 is threaded. Beads 68 allow the stirrup clevis 70, spinner blade 38 and chamber 132 to slide and rotate without restriction along the filament 114.

Figure 14:
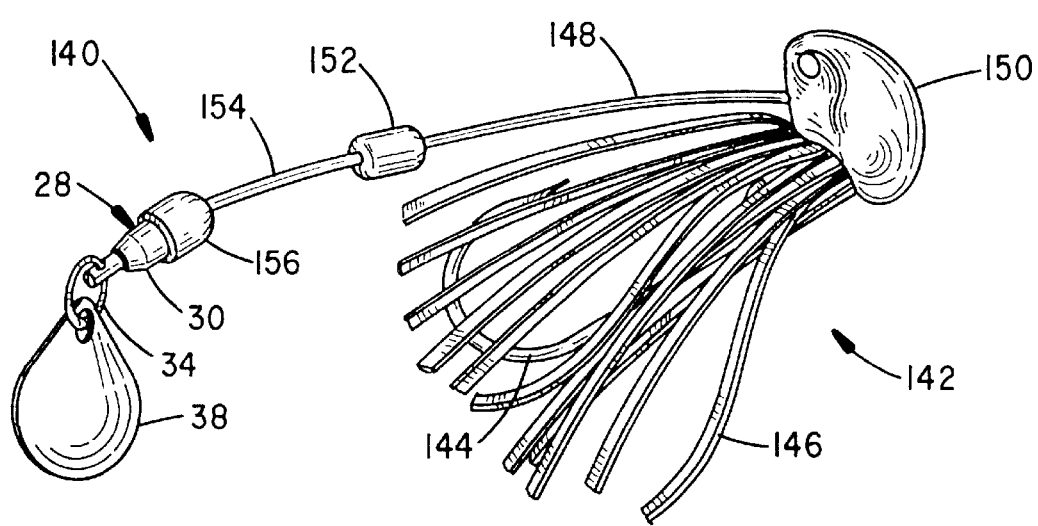
FIG. 14 is a perspective drawing showing a detachable, extension filament and swivel mounted spinner blade end cap mounted to the weed guard of a fishing jig.

A further alternative mounting of a modular spinner blade assembly 140 to a lure 142 is shown at FIG. 14. A jig-type lure 142 is shown that supports a hook 144, multi-stranded skirt 146 and a filamentary weed guard 148 from a molded head 150. The weed guard 150 can be constructed is a variety of conventional fashion and can provide one or more strands to shelter the hook 144.

The spinner blade assembly 140 is attached to an end of the weed guard 148 at a coupler 152. The coupler 152 can comprise an elastomer collar having a through bore sized to constrict over the filaments 148 and 154 or the filaments 148 and 154 can be adhesively bonded to the coupler 152. The coupler 152 can also comprise a plastic bead. The location of the coupler 152 can be varied as desired, although it preferably is positioned so that if the filament 148 contacts the hook 144, the coupler 152 deflects the filaments 148 and 154 from becoming entangled with hook 144. The filament 154 extends to a cap piece 156 that supports an assembly 28 having a swivel 30, split ring 34 and spinner blade 38.

Figure 15:
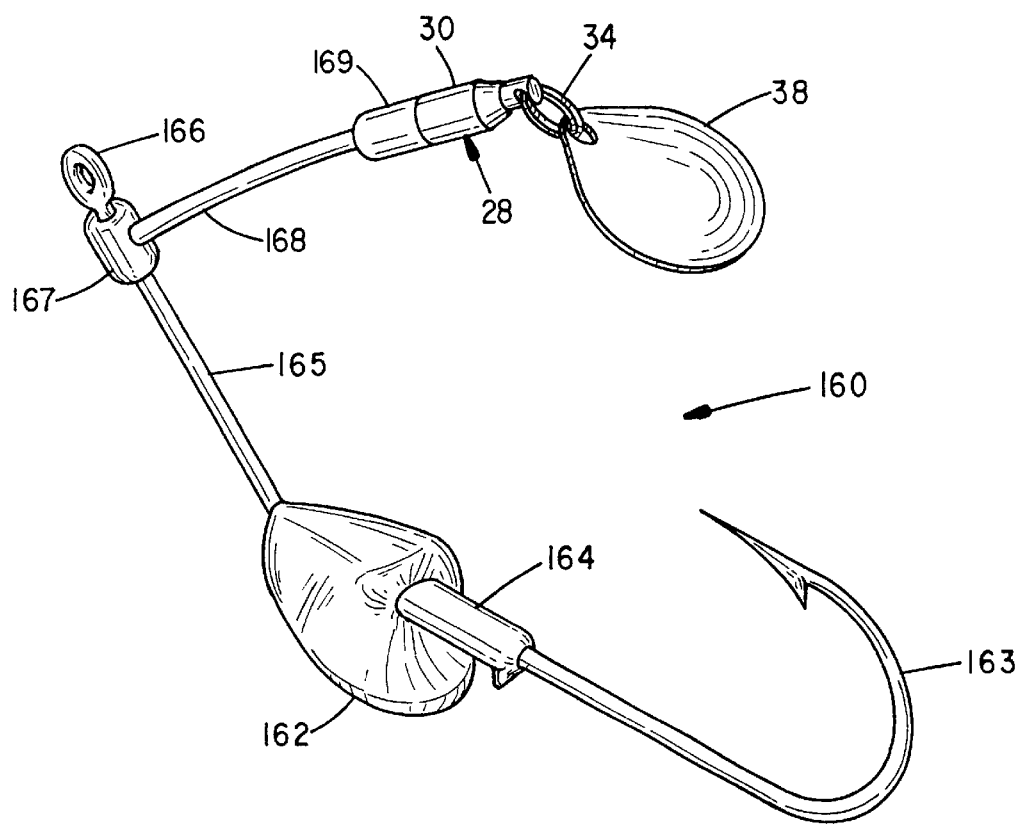
FIG. 15 is a perspective drawing showing a spinner bait having a wire form extension piece and from which an elastomer arm and swivel mounted spinner blade.
Figure 16:
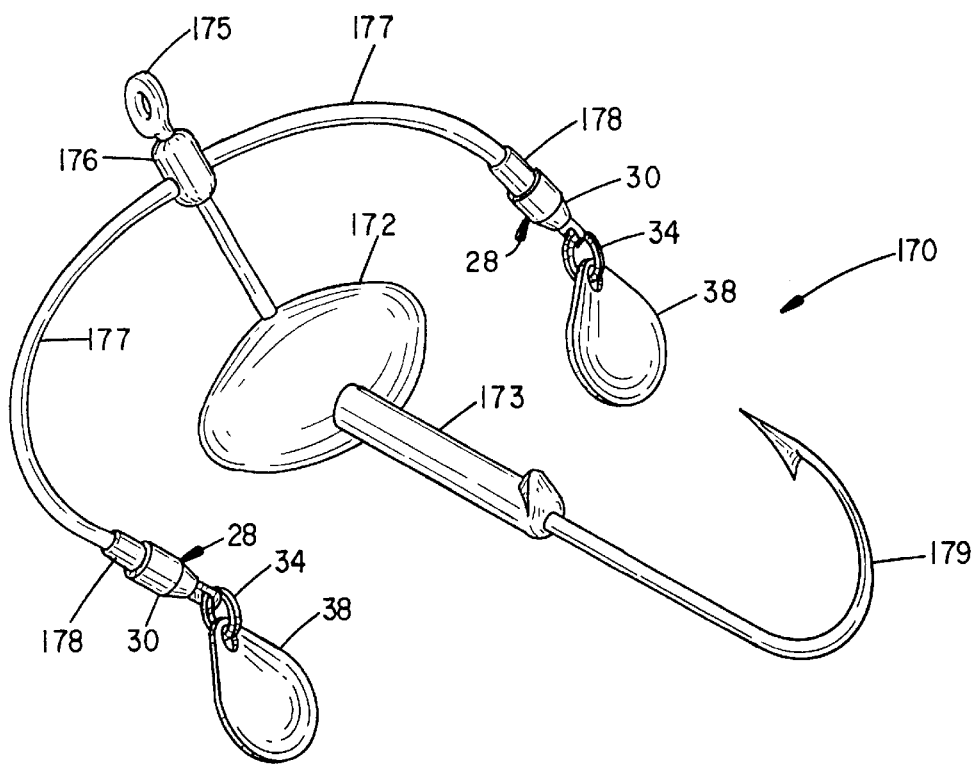
FIG. 16 is a perspective drawing showing a spinner bait having a wire form extension piece and to which a collar is attached that supports a pair of elastomer arms and swivel mounted spinner blades.
Figure 17:
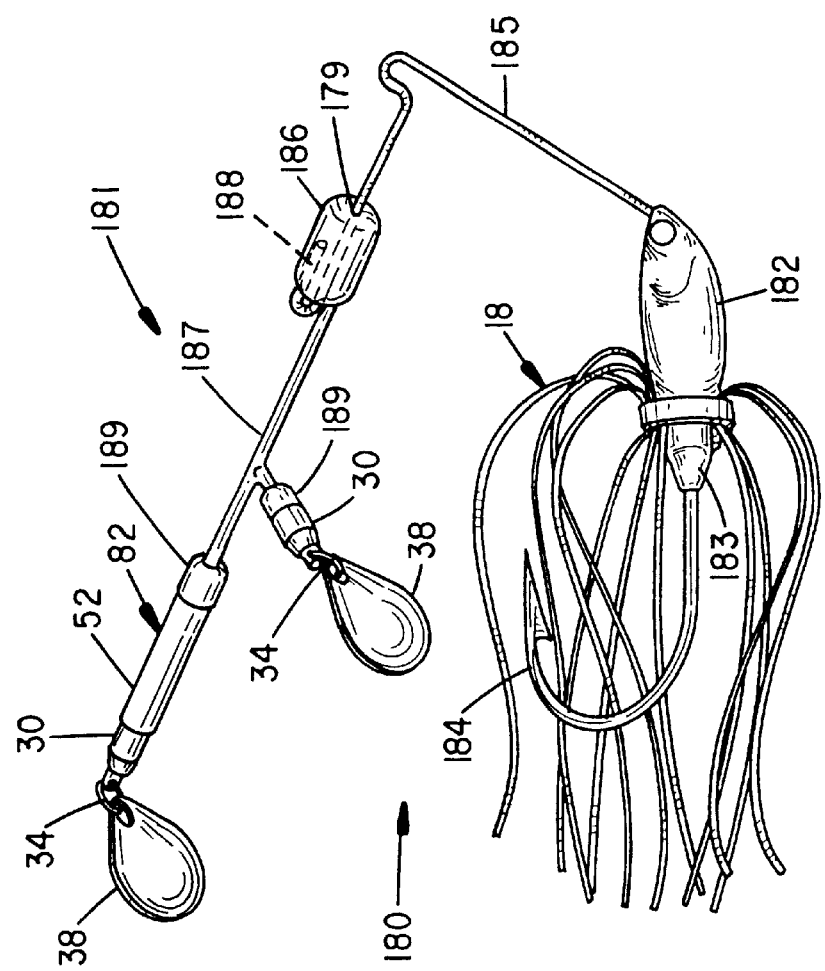
FIG. 17 is a perspective drawing showing a spinner bait having a wire form extension piece and from which an elastomer arm extends that supports a swivel mounted spinner blade and a rattle/spinner blade assembly.

Still other alternative spinner bait type lures 160, 170 and 180 are shown at FIGS. 15, 16 and 17. The lures 160, 170 and 180 each include flexible elastomer arms of suitable length, durometer and construction that are supported to a wire form that extends from a lure body or head. Lures of these types, commonly referred to as "spinner baits", are used in both freshwater and saltwater situations. Conventional spinner baits provide wire form arms constructed to support alternative combinations of spinner blades and rattles and vibrate with lure movement. Visual and audible attraction is thereby added to lure motion. The elastomer arm produces enhanced movement and vibration over conventional wire form arms. The elastomer arms are also more readily formed to any desired shape and can be added or changed as desired after the original assembly of a lure versus being molded to the head.

The lure 160 provides a molded body or head 162 of a preferred shape and a hook 163 extends from the head 162. Various dressings, such a multi-stranded skirt 18, rattle collar 20 etc., can be mounted to a barbed appendage 164 that projects from the head 162. Molded into and extending from the head 162 at a desired angle is a formed wire 165 that terminates in a twist eye 166. A plastic arm can be substituted in lieu of a wire arm 165. A bored elastomer collar 167 and projecting arm 168 are supported to the arm 165 and contain a spinner blade assembly 28, swivel 30, split ring 34 and spinner blade 38 at an end coupler 169. The thickness, length, shape and durometer of the arm 168 can be tailored to provide a desired rigidity and flexion relative to lure movement. The arm 168 can be molded from an elastomer material with a durometer in the range of 40 to 90 on the "Shor A" scale. The arm 168 can also be molded from a stiffer, more plastic material such as a thermoplastic rubber (TPR) having a durometer of 20 to 40 on the "Shor D" scale. It is to be appreciated other spinner blade and/or rattle assemblies such as described herein can be attached to the coupler 169 or the appending arms and couplers of any of the other lures 170 and 180.

The lure 170 of FIG. 16 provides a head 172 having a football or ellipsoid shape and from which a barbed appendage 173, hook 174 and wire form 175 extend. A tubular elastomer collar 176 and flexible arms 177 are supported to the wire form 175. Each arm 177 terminates at an end coupler 178 that contains a spinner blade assembly 84, swivel 30, split ring 34 and spinner blade 38.

The lure 180 of FIG. 17 provides a head 182 having a minnow shape and from which a flanged appendage 183, hook 184 and wire form 185 extend. A multi-stranded skirt 18 is secured to the appendage 183. A spinner blade assembly 181 is secured to the wire form 185. A tubular elastomer collar 186 and collinear arm 187 particularly extend from a J-shaped bend 188 at the wire form 185. A collar bore 179 mounts over the arm 185 and the collar 186 is slid back over the J-bend 188. A pair of couplers 189 at the arm 187 contains a spinner blade assembly 28 and a rattle/swivel blade assembly 82 such as shown at FIG. 7. The spinner blade assembly 181 can also be secured to the lures 160 and 170, with or without modifying the collar 186.

FIG. 18 illustrates an elastomer dressing 190 including a collar with an extending filament that supports a spinning blade for luring fish. In FIG. 18, the fishing accessory 190 is shown provided with an elastomer bulbous annular mounting collar 192. The bulbous annular mounting collar 192 is provided with a longitudinal bore 194 through a diameter of the collar 192 which provides an opening in the collar 192 for receiving a hook or another protrusion extending from an additional fishing device (shown in FIGS. 7 and 9) and for attaching the dressing to a fishing lure.

An elastomer filament 196, at a proximal end thereof, integrally extends from an exterior peripheral surface of the annular collar 192. The filament 196 also integrally extends from a peripheral exterior surface of a holder 198 at a distal end of the filament 196. The filament 196 provides a flexible and bendable elastomeric connection between the annular collar 192 and the holder 198. The holder 198 is designed and adapted to reciprocatingly and releasably retain a fishing accessory or fishing accessory holding assembly therein.

In FIG. 18, a spinning blade 38 is shown connected to the elastomer dressing 190 via a ring 34 connected to a spinner blade assembly 200 which is provided with a reciprocating portion receivable into the holder 198. The spinning blade assembly 200 includes a swivel that allows the spinner blade 38 or some other fishing accessory to freely rotate.

While the invention has been described with respect to a number of presently considered constructions and various considered modifications and improvements thereto, still other constructions may be suggested to those skilled in the art. The disclosed features might also be combined in other combinations and mounting arrangements to any variety of lures. The invention should therefore be broadly construed within the spirit and scope of the appended claims.

What is claimed is:

1. An elastomer dressing for a fishing lure, comprising i) a bulbous annular mounting collar, ii) a longitudinal bore that extends through a diameter of the bulbous mounting collar for attaching the dressing to a fishing lure, iii) an elastomer filament that at one end is connected to an exterior peripheral surface of the collar and extends from the peripheral surface of said collar, iv) a holder that is integrally connected to and extends from the other end of said filament and in axial alignment with a portion of said filament, and v) a spinner blade mounted to said holder, said holder further comprising an end cap having an opening in axial alignment with said portion of said filament.

2. An elastomer dressing as set forth in claim 1 wherein said spinner blade is mounted to a swivel that is secured to a recessed cavity of said holder.

3. A dressing for a fishing lure, comprising:
   i) a bulbous annular mounting collar;
   ii) a longitudinal bore that extends through a diameter of the bulbous mounting collar for attaching the dressing to the fishing lure, the bore having a longitudinal centerline;
   iii) an elongated filament that at one end is connected to an exterior peripheral surface of the collar at a non-zero angle relative to the centerline of the bore of said collar, the filament extending from the peripheral surface of said collar; and
   iv) a holder that is integrally connected to and extends from the other end of said filament and in axial alignment with a portion of said filament, said holder further comprising an end cap having an opening in axial alignment with said portion of said filament having a spinner blade thereto.

4. The dressing of claim 3, wherein said spinner blade is mounted to a swivel that is secured to a recessed cavity of said holder, said swivel in axial alignment with said portion of said filament.

\* \* \* \* \*